(12) United States Patent
Seyfried et al.

(10) Patent No.: US 7,190,451 B2
(45) Date of Patent: Mar. 13, 2007

(54) DETECTION DEVICE

(75) Inventors: Volker Seyfried, Nussloch (DE); Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 421 days.

(21) Appl. No.: 10/887,539

(22) Filed: Jul. 8, 2004

(65) Prior Publication Data

US 2005/0012927 A1 Jan. 20, 2005
US 2005/0254048 A9 Nov. 17, 2005

Related U.S. Application Data

(60) Provisional application No. 60/547,603, filed on Feb. 25, 2004.

(30) Foreign Application Priority Data

Jul. 15, 2003 (DE) ................................ 103 32 193

(51) Int. Cl.
*G01J 3/28* (2006.01)
(52) U.S. Cl. ...................................... 356/326; 356/328

(58) Field of Classification Search ................ 356/326, 356/328, 334
See application file for complete search history.

(56) References Cited

U.S. PATENT DOCUMENTS

| | | | | |
|---|---|---|---|---|
| 5,504,575 | A | * | 4/1996 | Stafford ....................... 356/330 |
| 6,396,053 | B1 | | 5/2002 | Yokoi .......................... 250/234 |
| 6,459,484 | B1 | | 10/2002 | Yokoi .......................... 356/318 |
| 6,864,975 | B2 | * | 3/2005 | Itoh et al. .................... 356/317 |

* cited by examiner

*Primary Examiner*—Hwa (Andrew) Lee
*Assistant Examiner*—Marissa J. Detschel
(74) *Attorney, Agent, or Firm*—Darby & Darby

(57) ABSTRACT

A detection device includes a spectral splitting device located in a detection beam path for spectrally splitting detection light into individual spectral components. A deflection device is located downstream of the spectral splitting device for deflecting the individual spectral components in different deflection directions onto detectors assigned to the individual spectral components. At least one optical element is located in the detection beam path downstream of the spectral splitting device and upstream of the deflection device such that at least one of the individual spectral components incident on the deflection device is collimated.

33 Claims, 3 Drawing Sheets

Direction of spectral splitting

Deflection direction

Direction of spectral splitting

Deflection direction

DETECTION DEVICE

Priority is claimed to provisional application 60/547,603, filed Feb. 25, 2004, and to German patent application 103 32 193.4, filed Jul. 15, 2003, the subject matter of each of which is hereby incorporated by reference herein.

The present invention relates to a detection device, in particular for use in a laser scanning microscope, including a means located in a detection beam path to spectrally split detection light into individual spectral components, and further including a deflection device located downstream of the means for spectral splitting to deflect the individual spectral components in different deflection directions onto detectors assigned to the individual spectral components.

BACKGROUND

A detection device of the type mentioned at the outset is known, for example, from U.S. Pat. Nos. 6,396,053 B1 and 6,459,484 B1. Specifically, the aforementioned documents describe a spectral detector having microelements for beam deflection. In the known detection device, which is designed as a spectral detector, different spectral components are spatially split. Located in the splitting plane is a microelement array which allows the different spectral components to be arbitrarily deflected in different directions, and thus to be detected by different detectors.

In the known detection device, the individual spectral components are focused by a lens into the plane of the deflection device, which is designed as a microelement array. As a result of this, the beams focused on the microelement array diverge or move apart shortly after impinging thereon. Due to this divergence, beams from different microelements can only be properly separated if the minimum deflection angle of the individual microelements is greater than this divergence. In other words, relatively large deflection angles are required to ensure proper separation of the beams or the light from different microelements. In this connection, however, it is a problem that the large deflection angles required cannot, or only with great difficulty, be achieved with the microelement arrays for beam deflection that are currently in use. In the final analysis, proper separation of the beams from different microelements is nearly impossible.

SUMMARY OF THE INVENTION

It is therefore an object of the present invention to provide a detection device of the type mentioned at the outset which allows the individual spectral components deflected by the deflection device to be reliably separated in a structurally simple manner.

According to the present invention, at least one optical element is arranged in the detection beam path downstream of the means for spectral splitting and upstream of the deflection device such that at least one spectral component of the light incident on the deflection device is collimated in at least one spatial direction.

In accordance with the present invention, it was discovered, first of all, that it is nearly impossible to reliably separate and detect the individual spectral components using the known detection device. Also according to the present invention, it was then found that the objective set forth above may be achieved by placing at least one optical element for at least one spectral component in the detection beam path downstream of the means for spectral splitting and upstream of the deflection device. By collimating the at least one spectral component in at least one spatial direction, divergence of the spectral component after striking the deflection device is avoided. This allows spectral components which are deflected in different directions to be reliably separated.

Consequently, the detection device provided by the present invention allows the individual spectral components deflected by the deflection device to be reliably separated in a structurally simple manner.

Specifically, the collimation that can be performed by the at least one optical element could be accomplished at least along a deflection direction. This means that upon activation of the deflection device, for example, when rotating micromirrors of the deflection device, every arbitrary beam coming from an arbitrary point of the deflection device describes a plane, and each section of one of the resulting planes is—in the actual sense—collimated, i.e., parallel with the beam of light coming from the deflection device.

In an embodiment of especially simple construction, the at least one optical element could be formed by a cylindrical optical element. Such a cylindrical optical element could be placed in the detection beam path by replacing the usually used condenser lens, or by arranging it between or upstream of this condenser lens and the deflection device. In this connection, the at least one optical element could have a cylindrical lens, preferably a convex cylindrical lens, which is particularly easy to implement.

Alternatively, the at least one optical element could have a spherical condenser lens and a downstream concave cylindrical lens. As a general principle, the at least one optical element, or a lens combination of the at least one optical element, should have essentially no refractive power in a deflection direction. Otherwise, unwanted divergences might occur here, preventing reliable separation of the spectral components after deflection.

In the case of the at least one optical element mentioned above, it is advantageous if a deflection direction perpendicular to a direction of spectral splitting is implemented. This allows the spectral components to be separated in a particularly reliable manner.

In an alternative embodiment, the at least one optical element has a short-focal-length collimating optical element. It would be particularly effective to arrange such a collimating optical element immediately upstream of the deflection device.

The collimating optical element could have a single lens, such as a concave cylindrical lens or a spherical concave lens in a structurally particularly simple manner.

In a refined design, the collimating optical element could have a microlens array of spherical or cylindrical lenses. This also ensures very effective collimation of the at least one spectral component. Specifically, the lenses could be concave lenses.

Alternatively, the collimating optical element could have curved mirrors arranged as a microarray which correspond to concave lenses. With regard to the optical components used, there are no limitations as long as the collimation is provided in a suitable manner.

When using a short-focal-length collimating optical element, it is important for the light to be collimated at least in a deflection direction. In this connection, the deflection direction of the deflection device can be selected arbitrarily and does not necessarily have to be perpendicular to the direction of spectral splitting.

The deflection device used can be any suitable optical component. Specifically, the deflection device could have a reflective or transmissive microelement array. The microelement array could be a micromirror array in a particularly simple manner. In this case, the micromirror array could be designed as an array of hinged mirrors.

With a view to a particularly high output of detected detection light and to a particularly reliable separation of the individual spectral components after deflection, the deflection device designed as a microelement array could have arranged upstream thereof a device to prevent detection light from falling onto gaps between the individual microelements of the microelement array. Detection light falling onto such gaps is mostly lost in an uncontrolled manner without being able to be detected.

Specifically, such a device could have a telescope of microlens arrays. However, other suitable devices are also conceivable.

Of course, the separation of the deflected spectral components is optimal at an infinitely large distance. In a particularly advantageous embodiment, therefore, infinity is, as it were, brought closer, for example, by a cylindrical or spherical lens located downstream of the deflection device. This arrangement allows the use of both arbitrarily small deflection angles for the deflection device, and single detectors arranged arbitrarily close together, such as CCD arrays, photodiode arrays, APD arrays, photomultiplyer arrays, etc.

To ensure a particularly reliable separation of the spectral components, an astigmatism-compensating optical element, preferably an astigmatic lens or a corresponding lens combination, could be arranged downstream of the deflection device, also in an advantageous manner. In this manner, the previously introduced astigmatism could be compensated for.

For this purpose, a divergence-compensating optical element, preferably a cylindrical optical element or a corresponding lens combination, could, for example, be arranged downstream of the deflection device. This would allow for compensation for the divergence of the detection light in the plane of spectral splitting, resulting in virtually completely collimated beams, or beams that would allow focusing to a point so that small detectors can be used as well.

In this connection, it would be advantageous for a focusing optical element, preferably in the form of a cylindrical optical element, to be arranged downstream of the deflection device to focus the light onto a detector. It would also be possible to use further deflection mirrors.

Depending on the particular application, suitable mirror arrangements, or curved mirrors, or Fresnel zone plates could be used in place of one or more of the aforementioned lenses. In this connection, there are no system-related limitations.

BRIEF DESCRIPTION OF THE DRAWINGS

The teaching of the present invention can be embodied and refined in different ways. The invention is elaborated upon below based on exemplary embodiments with reference to the drawings.

DETAILED DESCRIPTION

Figure 1A:
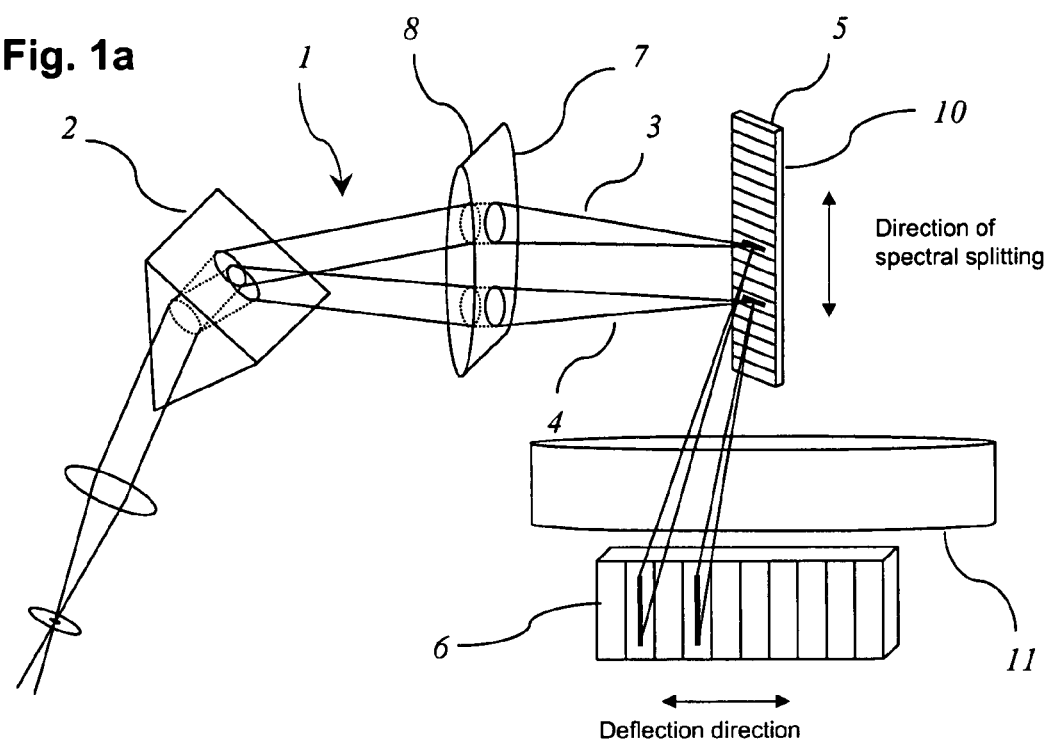
FIGS. 1a and 1b are schematic perspective views of a first exemplary embodiment of a detection device according to the present invention with a cylindrical lens serving as at least one optical element.
Figure 1B:
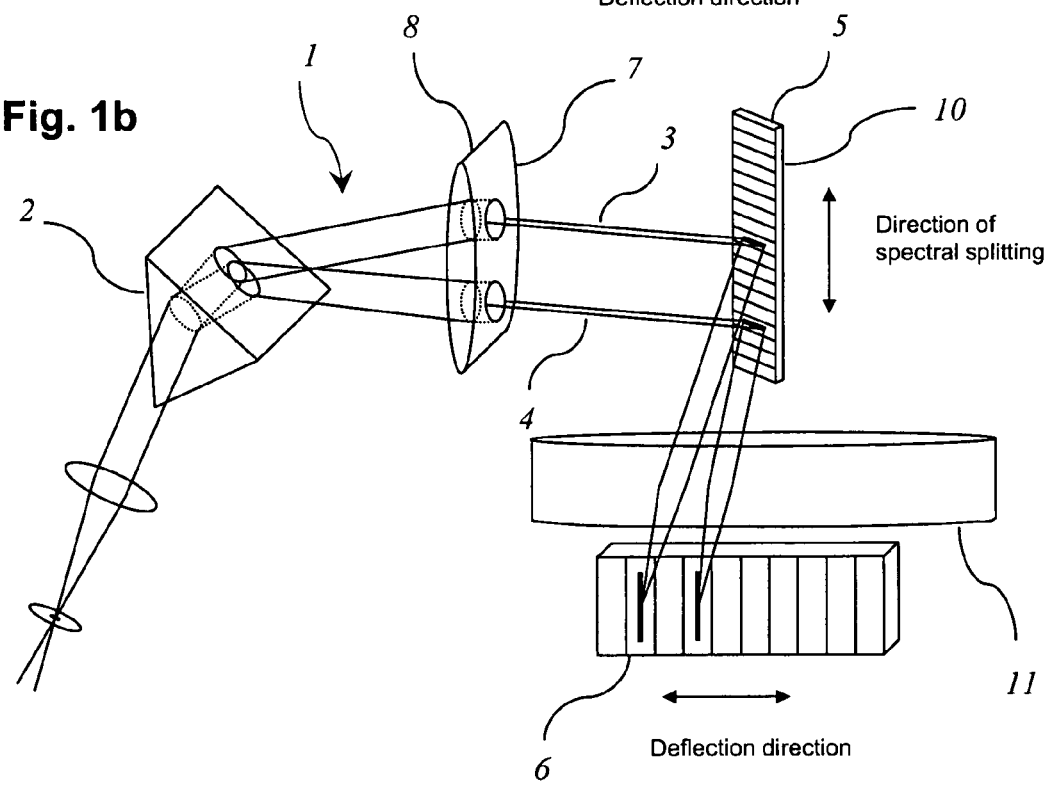

FIGS. 1a and 1b schematically show a first exemplary embodiment of a detection device according to the present invention in a perspective view, the detection device being usable, in particular, in a laser scanning microscope. The detection device has a means 2 located in a detection beam path 1 to spectrally split detection light into individual spectral components 3 and 4, and a deflection device 5 located downstream of the means 2 for spectral splitting to deflect the individual spectral components 3 and 4 in different deflection directions onto detectors 6 assigned to the individual spectral components 3 and 4. The means 2 for spectral splitting is designed as a prism, but it is also conceivable for the means 2 to be designed as a grating or hologram.

With a view to reliable separation of the individual spectral components 3 and 4 deflected by deflection device 5 in a structurally simple manner, an optical element 7 is arranged in detection beam path 1 downstream of the means 2 for spectral splitting and upstream of deflection device 5 for at least one spectral component 3 or 4, here for both components 3 and 4.

The collimation that can be performed by optical element 7 is accomplished along the deflection direction; i.e., the beams shown in FIG. 1b run parallel without divergence, whereas the beams shown in FIG. 1a are in one plane, but apart from that they diverge. Optical element 7 is formed by a cylindrical optical element 8 and, specifically, by a cylindrical lens.

FIGS. 1a and 1b differ only in the light beams depicted downstream of the cylindrical lens. The cylindrical lens influences the detection beam only in the direction of spectral splitting which is selected to be perpendicular to the deflection direction of deflection device 5. Because of this, the light beams of the different spectral components remain perpendicular to the spectral splitting, and no divergence occurs in the direction of deflection of the microelements of deflection device 5, which is designed as an array of hinged mirrors 10. This ensures that the light deflected in different directions by different microelements of deflection device 5 can always be separated at a sufficient distance from deflection device 5, independently of how small the deflection angles are. The separation is optimal at an infinitely large distance. In the exemplary embodiment shown, therefore, infinity is, as it were, brought closer by a cylindrical lens 11.

Both in FIGS. 1a and 1b and in all following Figures, the direction of spectral splitting and the deflection direction are each marked by a double arrow.

In the case of a conventional design having, for example, a spherical focusing lens, or a deflection in the direction of spectral splitting, a light cone would emanate from each microelement in the direction of deflection so that proper separation of the light directed in different directions by the different microelements can only be achieved for sufficiently large deflection angles.

Both in the exemplary embodiment shown here and those described below, spectral components 3 and 4 are both caused to undergo collimation. This ensures a particularly reliable separation of spectral components 3 and 4.

In the exemplary embodiment shown in FIGS. 1a and 1b, it is essential for optical element 7 not to have any refractive power in the direction of deflection.

A second way to perform collimation at least along a deflection direction is shown in FIG. 2. Here, a short-focal-length collimating optical element 9 is arranged closely upstream of deflection device 5. A similar embodiment is shown in the exemplary embodiment according to FIGS. 3a and 3b, the collimating optical element 9 of FIG. 2 being designed as a concave cylindrical lens, and the collimating optical element 9 of FIG. 3 being designed as a spherical concave lens. The function of these lenses is to collimate the light at least in the deflection direction—such as in a Galilean telescope—, in which case the deflection direction of the microelements can be selected arbitrarily without necessarily having to be perpendicular to the spectral splitting.

Figure 2A:
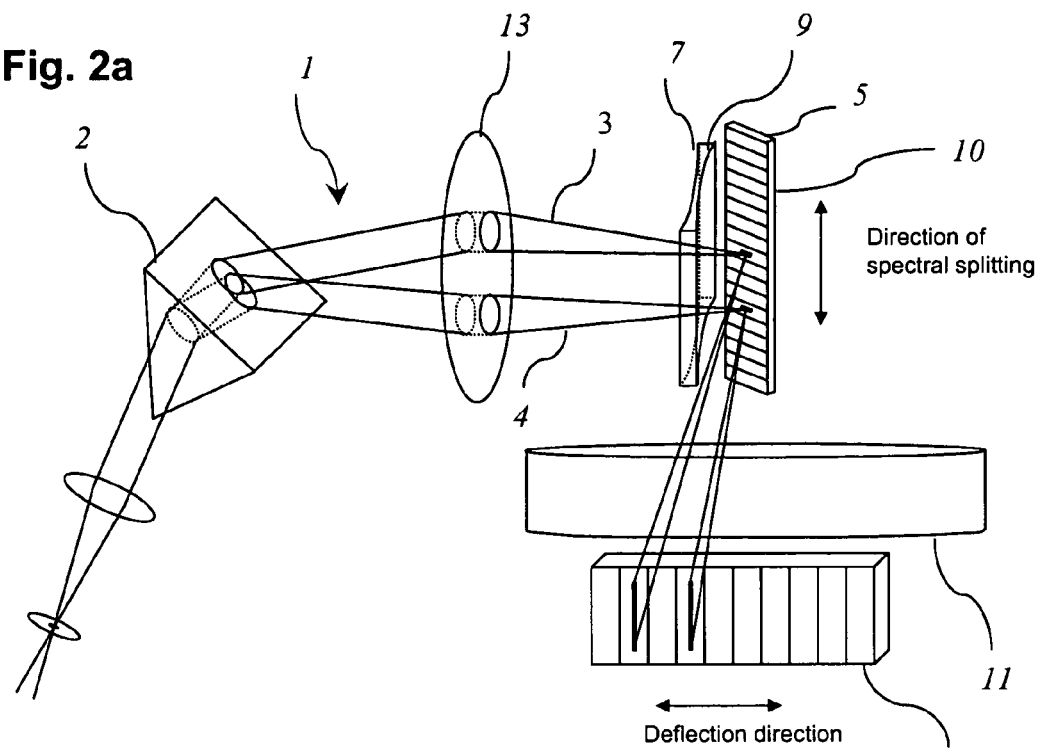
FIGS. 2a and 2b are schematic perspective views of a second exemplary embodiment of a detection device according to the present invention having a short-focal-length collimating optical element.
Figure 2B:
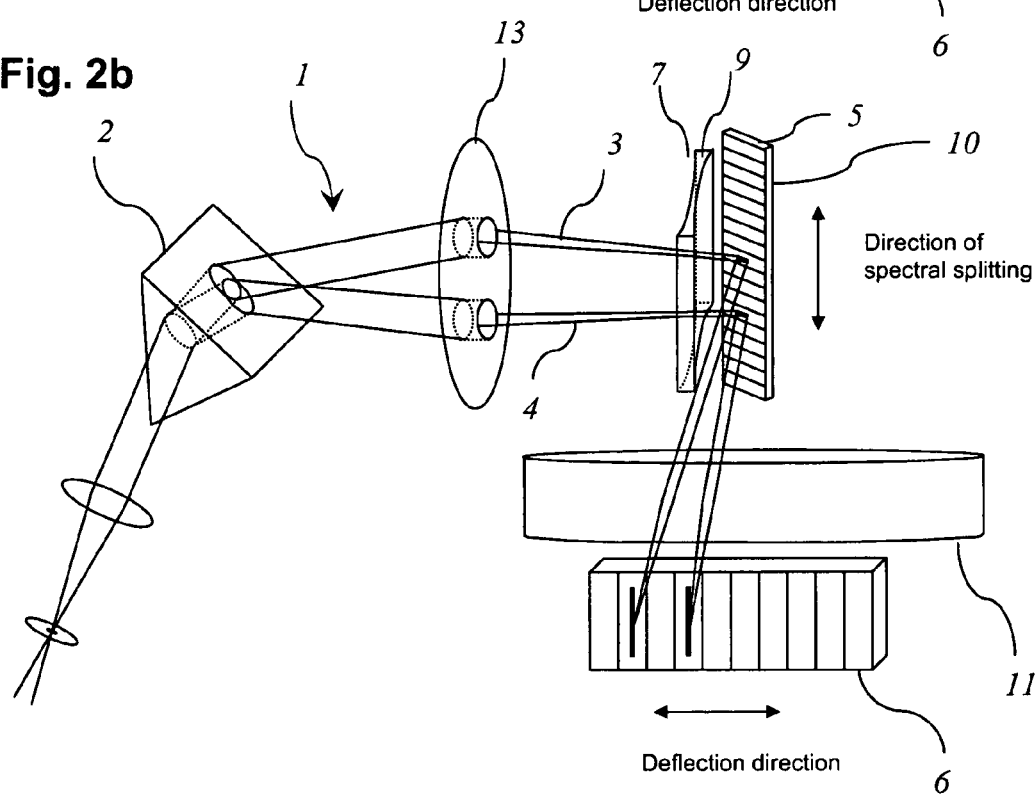
Figure 3A:
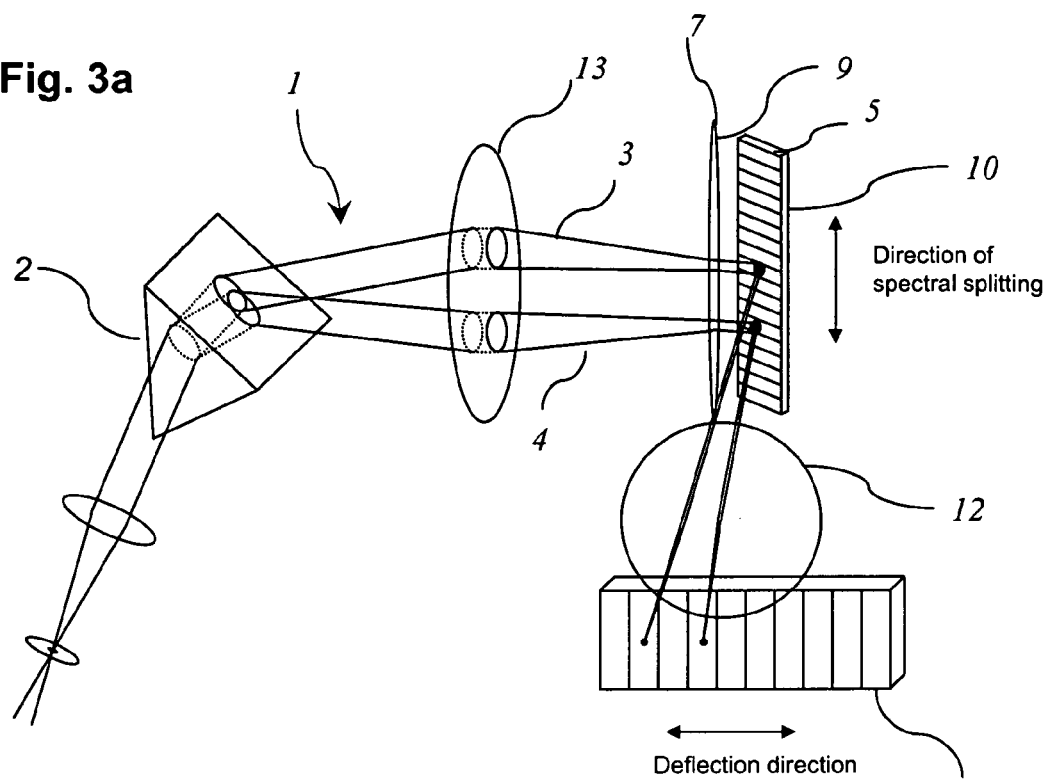
FIGS. 3a and 3b are schematic perspective views of a third exemplary embodiment of a detection device according to the present invention having a short-focal-length collimating optical element.
Figure 3B:
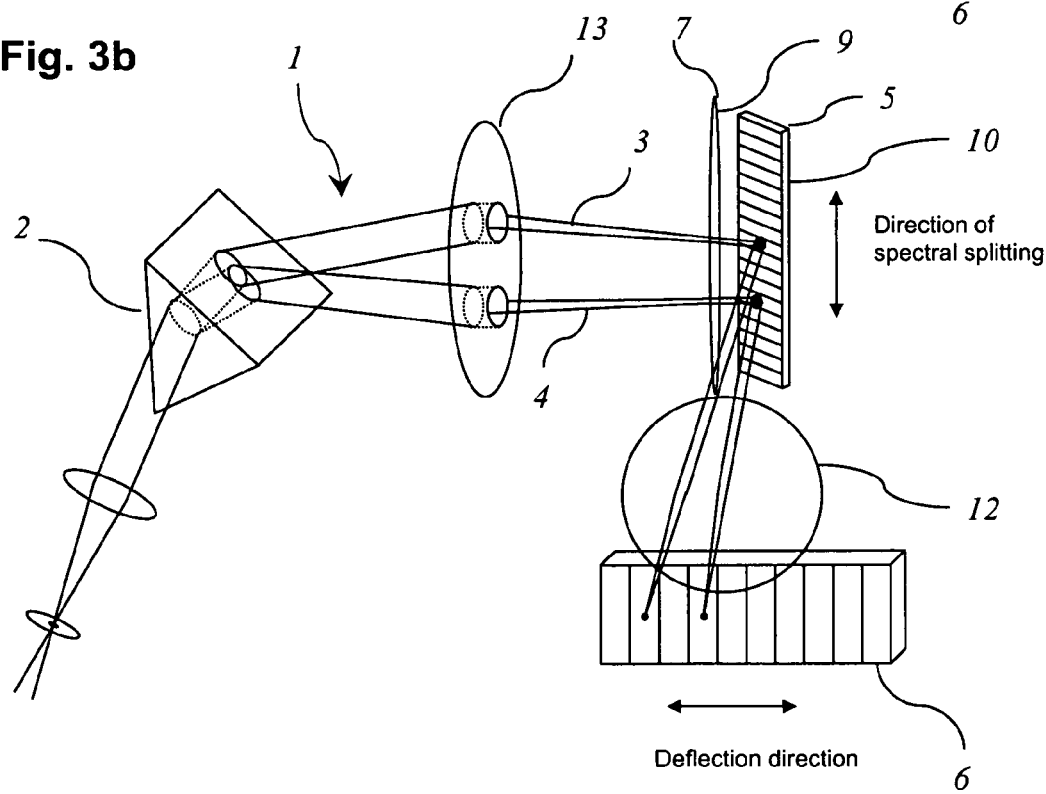

In the exemplary embodiment shown in FIGS. 2a and 2b, a cylindrical lens 11 is arranged downstream of deflection device 5. In contrast, in the exemplary embodiment shown in FIGS. 3a and 3b, a focusing optical element 12 is provided to focus the deflected spectral components onto respective detector areas.

In the exemplary embodiments shown in FIGS. 2a, 2b and 3a, 3b, a condenser lens 13 is arranged downstream of means 2 for spectral splitting in a conventional manner. Here, the collimation is provided by an optical element 7 in the form of a short-focal-length collimating optical element 9 located between condenser lens 13 and deflection device 5. In contrast, the exemplary embodiment shown in FIGS. 1a and 1b does not have such a condenser lens 13.

With regard to further advantageous embodiments and refinements of the teaching of the present invention and to avoid repetitions, reference is made to the general portion of the specification and to the appended patent claims.

Finally, it should be noted explicitly that the exemplary embodiments described above serve merely for discussion of the teaching of the present invention, without limiting it to the exemplary embodiments discussed.

What is claimed is:

1. A detection device comprising:
   a spectral splitting device disposed in a detection beam path and configured to spectrally split detection light into a plurality of individual spectral components;
   a deflection device disposed downstream of the spectral splitting device and configured to deflect each of the individual spectral components in a respective different deflection direction onto a respective detector; and
   at least one optical element disposed in the detection beam path downstream of the spectral splitting device and upstream of the deflection device and configured to provide to the deflection device at least one of the individual spectral components collimated in at least one spatial direction.

2. The detection device as recited in claim 1 wherein the detection device is configured for use in a laser scanning microscope.

3. The detection device as recited in claim 1 wherein the at least one spatial direction includes a first of the respective different deflection directions.

4. The detection device as recited in claim 1 wherein the at least one optical element includes a cylindrical optical element.

5. The detection device as recited in claim 1 wherein the at least one optical element includes a cylindrical lens.

6. The detection device as recited in claim 5 wherein the at least one optical element includes a convex cylindrical lens.

7. The detection device as recited in claim 1 wherein the at least one optical element has substantially no refractive power in a first of the respective different deflection directions.

8. The detection device as recited in claim 7 wherein the at least one optical element includes a lens combination.

9. The detection device as recited in claim 1 wherein the at least one optical element includes a spherical condenser lens and a downstream concave cylindrical lens.

10. The detection device as recited in claim 1 wherein a first of the respective different deflection directions is perpendicular to a direction of spectral splitting of the spectral splitting device.

11. The detection device as recited in claim 1 wherein the at least one optical element includes a short-focal-length collimating optical element.

12. The detection device as recited in claim 11 wherein the collimating optical element is disposed immediately upstream of the deflection device.

13. The detection device as recited in claim 11 wherein the collimating optical element includes a single lens.

14. The detection device as recited in claim 13 wherein the single lens is a concave cylindrical lens or a spherical concave lens.

15. The detection device as recited in claim 11 wherein the collimating optical element includes a microlens array of spherical or cylindrical lenses.

16. The detection device as recited in claim 15 wherein the lenses includes concave lenses.

17. The detection device as recited in claim 11 wherein the collimating optical element includes curved mirrors arranged as a microarray, the curved mirrors corresponding to concave lenses.

18. The detection device as recited in claim 1 wherein the deflection device includes at least one of a reflective and a transmissive microelement array.

19. The detection device as recited in claim 18 wherein the microelement array includes a micromirror array.

20. The detection device as recited in claim 19 wherein the micromirror array includes an array of hinged mirrors.

21. The detection device as recited in claim 18 further comprising a focusing device disposed upstream of the microelement array and configured to prevent detection light from falling onto gaps between individual microelements of the microelement array.

22. The detection device as recited in claim 21 wherein the focusing device includes a telescope of microlens arrays.

23. The detection device as recited in claim 1 further comprising at least one of a cylindrical lens and a spherical lens disposed downstream of the deflection device.

24. The detection device as recited in claim 1 further comprising an astigmatism-compensating optical element disposed downstream of the deflection device.

25. The detection device as recited in claim 24 wherein the astigmatism-compensating optical element includes an astigmatic lens or a corresponding lens combination.

26. The detection device as recited in claim 24 wherein the astigmatism-compensating optical element includes at least one of a mirror and a Fresnel zone plate.

27. The detection device as recited in claim 1 further comprising a divergence-compensating optical element disposed downstream of the deflection device.

28. The detection device as recited in claim 27 wherein the divergence-compensating optical element includes a cylindrical optical element or a corresponding lens combination.

29. The detection device as recited in claim 27 wherein the divergence-compensating optical element includes at least one of a mirror and a Fresnel zone plate.

30. The detection device as recited in claim 1 further comprising a focusing optical element disposed downstream of the deflection device and configured to focus light of at least a first of the individual spectral components onto the respective assigned detector.

31. The detection device as recited in claim 1 wherein the at least one optical component includes at least one of a mirror and a Fresnel zone plate.

32. The detection device as recited in claim 1 wherein the at least one optical component includes a mirror arrangement.

33. The detection device as recited in claim 1 wherein the at least one optical component includes curved mirrors.

* * * * *